Jan. 2, 1968   R. J. LECH ET AL   3,360,932
ROTARY EMITTANCE VALVE
Filed May 5, 1966                                    3 Sheets-Sheet 3
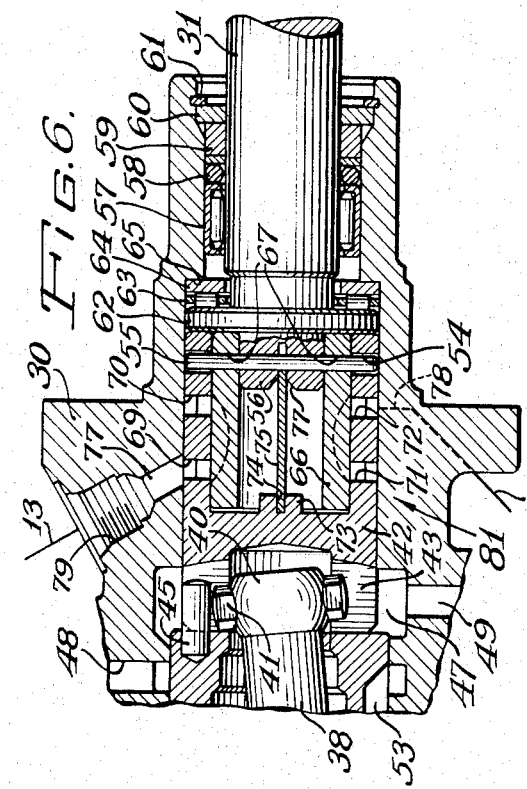
Inventors:
Richard J. Lech
Joseph F. Ziskal
By Walter Gregory
Atty.

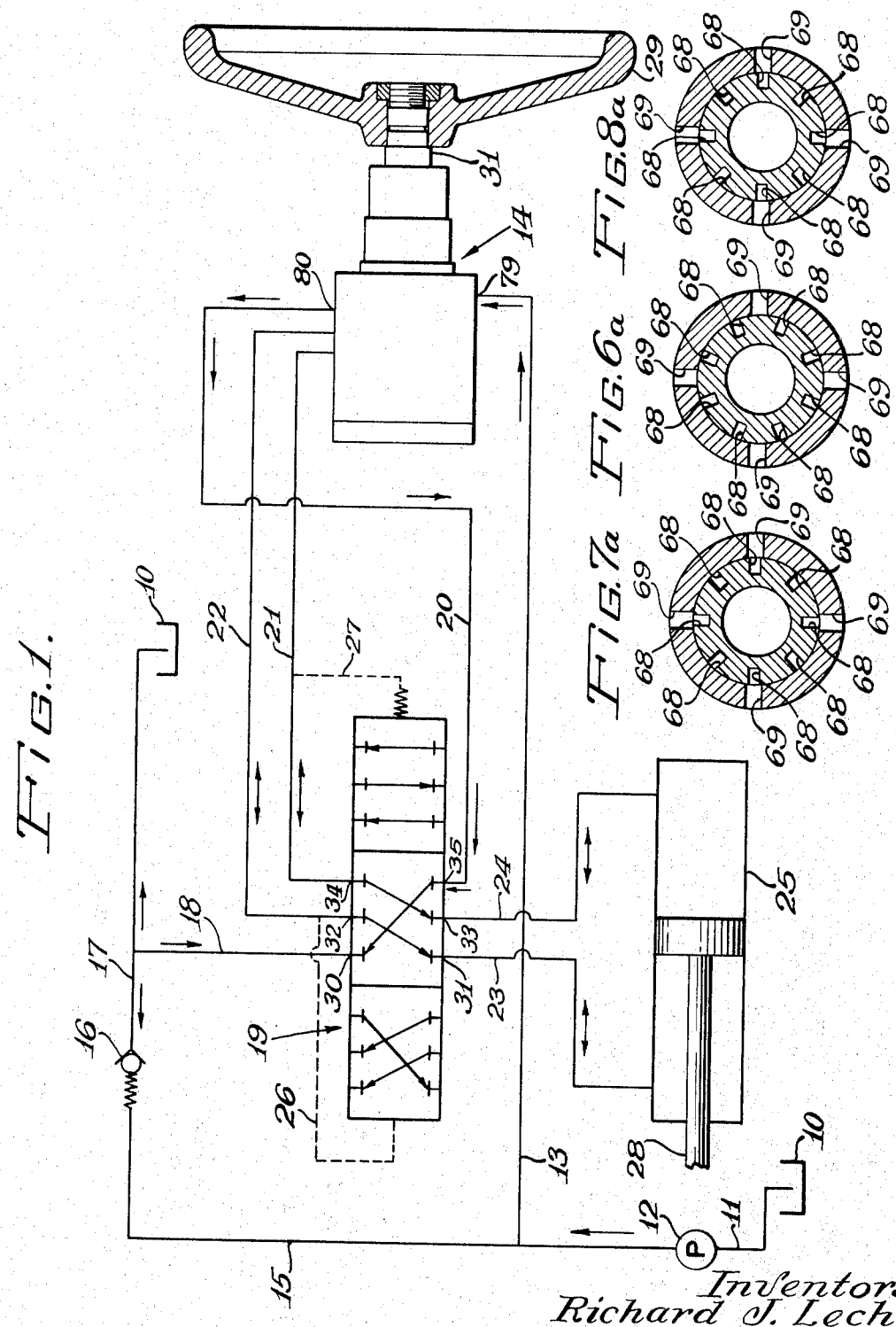

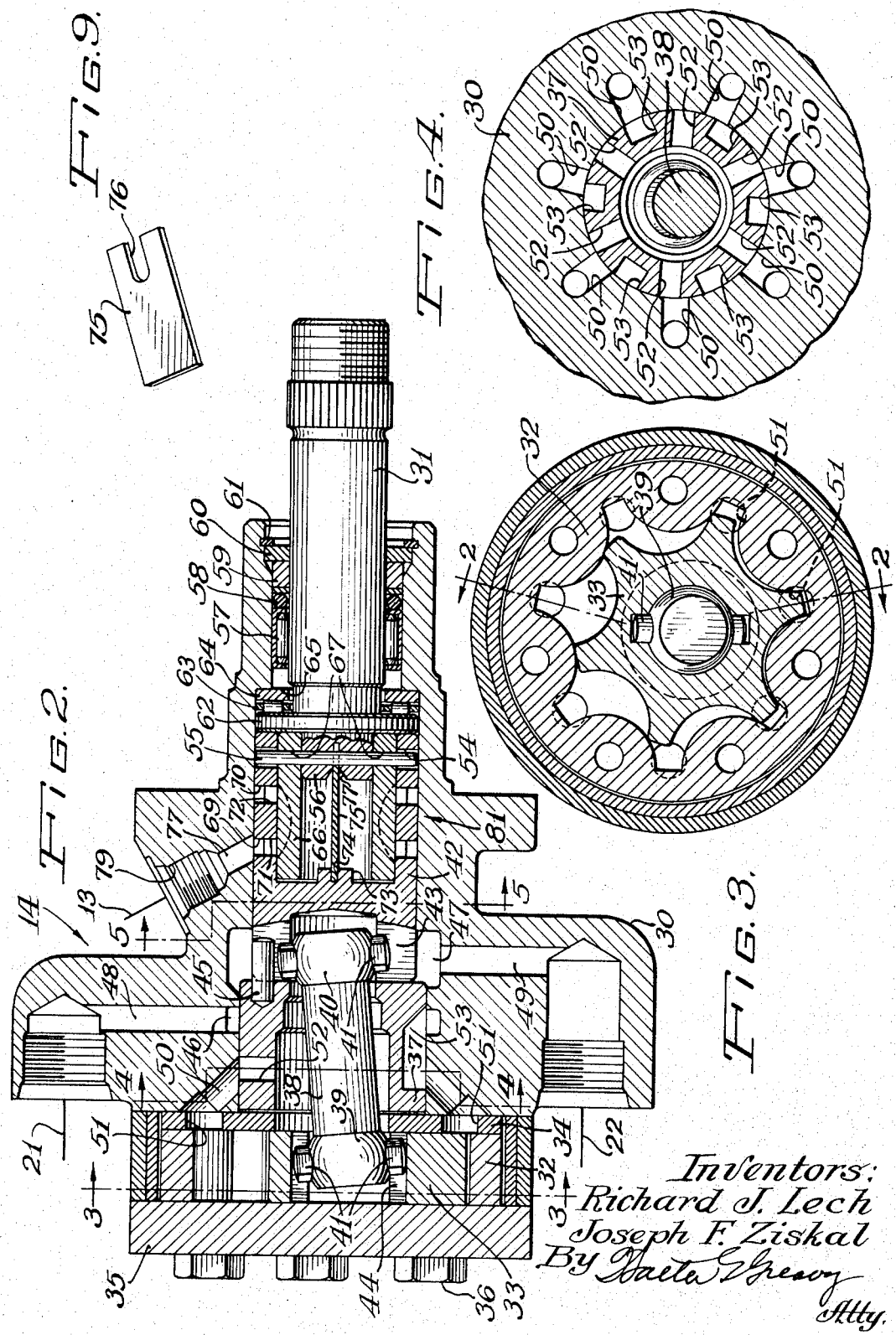

United States Patent Office 3,360,932
Patented Jan. 2, 1968

3,360,932
ROTARY EMITTANCE VALVE
Richard J. Lech, Hickory Hills, and Joseph F. Ziskal, Downers Grove, Ill., assignors to International Harvester Company, Chicago, Ill., a corporation of Delaware
Filed May 5, 1966, Ser. No. 547,969
10 Claims. (Cl. 60—52)

This invention relates to hydrostatic power steering systems for vehicles, but more particularly it is concerned with valving means for converting a steering system of this type from an open-center to a closed-center hydraulic system.

In hydrostatic power steering systems it has been the preferred practice to employ a differential pressure actuated linear spool-type shuttle valve for the control of the direction of flow of fluid being directed under pressure to the fluid motor or power cylinder of the system. In the well-known open-center type systems a valve of this character was found to operate very satisfactorily. However, attempts heretofore made to adapt a valve of this type to a closed-center system have not been altogether satisfactory because of the tendency of such a valve to accumulate deposits of silt therein thereby causing difficulty in the operation thereof. Since the present trend in the industry is to employ more closed-center hydraulic systems the desirability for a simplified and effective means for converting an existing open-center hydraulic system to a closed-center system becomes of increasing economic importance.

It is a primary object of the present invention, therefore, to provide a simplified means for converting a hydrostatic power steering system from an open-center to a closed-center hydraulic system.

Another object is to provide an improved hydrostatic power steering system of the type that utilizes a linear spool-type shuttle valve for directional control of the flow of fluid in the system.

A further object is to provide a rotary emittance valve operatively cooperative with the hand-pump unit of a hydrostatic power steering system and operative for interrupting flow of fluid through said system except upon demands of fluid flow within said system.

A still further object is to provide a rotary valve mechanism adapted for incorporation in a housing assembly containing the hand-pump of a conventional hydrostatic power steering system and operative responsive to rotation of an operator's steering wheel coupled therewith for selectively admitting and interrupting the flow of fluid from a pressure source to a fluid motor connected in said system.

Further objects and advantages of the present invention will be apparent from the full description, a reference being had to the accompanying drawings wherein a preferred form of the present invention is clearly shown.

FIGURE 1 is a schematic representation of a hydrostatic power steering system embodying the proposed invention with a portion of the operator's wheel thereof being shown in section;

FIGURE 2 is a longitudinal vertical sectional view of a hydrostatic power steering hand-pump assembly incorporating the present invention therein;

FIGURE 3 is a vertical sectional view taken along the line 3—3 of FIGURE 2;

FIGURE 4 is a fragmentary vertical sectional view taken along the line 4—4 of FIGURE 2;

FIGURE 5 is a vertical sectional view taken along the line 5—5 of FIGURE 2;

FIGURE 6 is a fragmentary sectional view of the proposed valve mechanism and shown in a neutral position;

FIGURE 7 is a fragmentary sectional view of the proposed valve mechanism and shown in a right turn position;

FIGURE 8 is a fragmentary sectional view of the proposed valve mechanism and shown in a left turn position;

FIGURES 6a, 7a, 8a are vertical sectional views of the inner and outer sleeve members of the proposed valve in the respective corresponding positions of FIGURES 6, 7 and 8; and FIGURE 9 is a perspective view of the leaf spring incorporated in the proposed valve mechanism.

Referring now to the drawings it will be seen that FIGURE 1 shows somewhat schematically the components of a hydrostatic power steering system wherein a reservoir source of fluid 10 is connected by a conduit 11 with the inlet of a hydraulic supply pump 12, while the outlet of said pump connects by a conduit 13 with a hand-pump assembly, indicated generally by the reference numeral 14, and by a branch conduit 15 with a conventional check valve 16. The opposite side of said check valve connects by a conduit 17 with reservoir 10 and by a branch conduit 18 with a shuttle valve represented generally by the reference numeral 19. Conduits 20, 21 and 22 communicatively interconnect said shuttle valve and the hand-pump assembly 14, while conduits 23 and 24 interconnect the shuttle valve with opposite ends of a conventional fluid motor or power cylinder 25, and branch conduits 26, 27 interconnect conduits 21 and 22 with opposite ends of said shuttle valve. It will be understood the piston rod 28 of cylinder 25 will be suitably connected by well-known operating means with the vehicle wheels to be steered, while hand-pump assembly 14 will be provided with suitable operating-control means such as the operator's steering wheel indicated at 29.

The shuttle valve 19 may be of conventional construction and one well-known such valve suitable for this purpose is the linear spool, spring centered, open-center, differential pressure operated unit manufactured by the Ross Gear and Tool Company, Inc. of Lafayette, Indiana and marketed under the trade designation of Hydrostatic Valve-Standard HDS–V2, 7–62. Generally similar although identical shuttle valves are also shown and described in the U.S. Cassady et al. Patents 2,974,491 and 2,995,012. Shuttle valve 19 includes oppositely disposed ports 30–31, 32–33 and 34–35 which communicate with the respective conduits 18–23, 22–24 and 21–20, while the spool element thereof is displaceable to the right or left responsive to pressure differentials established in opposite ends of said valve by way of the branch conduits 26–27 as is well understood.

The hand-pump assembly 14 selected for purposes of illustrating a preferred application of the present invention is substantially identical, except for the modifications proposed herein, to the unit manufactured by the Ross Gear and Tool Company Inc. of Lafayette, Indiana and marketed under the trade designation of Hydrostatic Hand Pump HDS–P2, 11–62, and described in detail in the U.S. Dettlof et al. Patent 3,087,436.

In said hand-pump assembly a housing 30 having a bore therein receives a drive shaft 31 which projects from one end of the housing and has secured to the outwardly projecting end thereof the operator's control wheel 29. The opposite end of said housing mounts the pump elements which include an interiorly toothed outer-annular element 32 and an exteriorly toothed inner element 33, plus a wear plate 34 disposed between element 32 and an adjacent wall or face of housing 30 that is clamped along with the outer element between the housing and a cover plate 35 by suitable fastening means such as the bolts 36.

A valve sleeve 37 in the bore of said housing accommodates a shaft 38 therethrough, for transmitting drive from drive shaft 31 to the inner pump element 33, with the ends of shaft 38 formed as frusto-spherical heads 39, 40 and having a pair of diametrically opposite studs 41 projecting radially therefrom. An outer sleeve member 42, interconnected with drive shaft 31 as hereinafter explained, is fashioned with an axial recess which receives the head 40 of shaft 38 and with a diametrically extending slot 43 that silably receives the studs 41 of head 40. Inner pump element 33 has a central bore for receiving head 39 and axially extending grooves 44 for slidably receiving the studs 41 of the latter head.

The meshing teeth of the inner and outer pump elements are formed, as is well-known, so that as inner element 33 rotates on its axis it orbits within the outer element while said teeth cooperate effectively to divide the space between these elements into suction and pressure chambers, each of which alternately expands and contracts as the inner element 33 orbits. A drive pin 45 mounted in sleeve valve 37 and projecting therefrom extends into one end of slot 43 and sleeve member 42 and serves for rotating sleeve valve 37 at the same speed as drive shaft 31.

Annular grooves 46, 47 opening into the bore of housing 30 communicate respectively with radial passages 48, 49 therein which, in turn, communicatively interconnect with the respective conduits 21, 22. Since annular groove 47 is disposed in the plane of slot 43 it is in continuous communication through said slot with the interior of valve sleeve 37, while annular groove 46 is located within the axial limits of sleeve 37. A circumferential series of ports 50 in housing 30 open into the bore thereof and communicate respectively, through openings 51 in wear plate 34 with the spaces between the teeth of outer pump element 32. A series of radial passages 52 in valve sleeve 37, corresponding in number to the teeth of the inner pump element 33, cooperate with ports 50. Intermediate adjacent ones of the radial passages 52 the exterior surface of valve sleeve 37 is provided with axially extending grooves 53 which overlap annular groove 46 and cooperate with the ports 50 in housing 30.

The manner in which the radial passages 52 and the annular grooves 53 cooperate with ports 50 to establish fluid communication between the pump chambers and housing passages 48, 49 will be apparent from FIGURES 3 and 4 wherein the inner pump element 33 and valve sleeve 37 are shown in their simultaneously occupied positions. Passages 52, 53 are so oriented with respect to the teeth of inner pump element 33 that as each of such teeth reaches the point of deepest mesh with a space between the teeth of outer element 32 the valving port 50 will be occluded by one of the lands of valve sleeve 37.

It will be readily apparent from the above that the valve passages 52 and the grooves 53 will cooperate communicatively with the ports 50 to connect each expanding pump chamber with one of the annular grooves 46, 47 and each contracting pump chamber to the other of such annular grooves. As shown, counterclockwise rotation of drive shaft 31 will produce clockwise orbiting of the inner pump element, connecting of contracting pump chambers to annular groove 47 through radial passages 52 and connection of expanding chambers to annular groove 46 through valve grooves 53.

Now in accordance with the more specific teachings of the present invention the outer sleeve valve member 42 is provided with diametrically opposite, circumferentially extending, radial slots 54 which receive therein in a circumferentially slidable relation opposite ends of a pin 55 that, in turn, is suitably secured to a reduced section end portion 56 of drive shaft 31. Although any suitable means may be used for the purpose it has been found that a press fit connection of pin 55 in a transverse bore in shaft portion 56 provides a very satisfactory securement for said pin. Shaft 31 may be journalled by an anti-friction bearing such as 57 disposed in the bore of housing 30, while an adjoining fluid seal ring 58 backed up with a washer 59 and spacer 60 are maintained in position by a snap-ring 61 mounted in an annular groove in the housing bore proximate the end thereof.

An enlarged guide ring 62 on shaft portion 56 and constrained for movement therewith is disposed for abutment against an end edge of the outer sleeve 42 while abutting the opposite face of said guide ring is an anti-friction thrust bearing 63 which additionally abuts a back-up washer 64 that in turn closely abuts a shoulder face 65 formed at the end of an enlarged portion of the housing bore and which enlarged portion is adapted to receive therein the outer sleeve memeber 42. As thus arranged axial forces imposed on the sleeve valve member 42 are readily accommodated by the thrust bearing 63 and the shoulder abutment 65.

Rotatably disposed within the outer valve member 42 is an inner sleeve-like valve 66 which may be fashioned as a cylindrical member having diametrically opposite radial openings 67 dimensioned to tightly receive in a press-fit fashion the pin 55 whereby said inner sleeve will be rotated with shaft 31. Said inner sleeve valve 66 is also fashioned with a plurality of circumferentially spaced, axially extending grooves 68 for a purpose which will presently be further discussed.

The exterior surface of the outer sleeve valve member 42 is fashioned with a pair of axially spaced-apart annular grooves 69, 70 and with a plurality of circumferentially spaced, radial passages 71, 72 extending from the respective annular grooves to the interior of said outer sleeve member. The radial passages 71 and 72 are so spaced axially as to be in registering alignment with opposite ends of the axial passages 68 in the inner sleeve member 66 upon relative rotation of said inner and outer members. The circumferentially extending slot-like openings 54 in outer sleeve member 42, preferably, are dimensioned so as to permit a movement of pin 55 of approximately 10° from either side of a neutral position. It will be readily appreciated of course that the length of such slotted-openings will be coordinated with the spacings and dimensions of the axial passages 68 and with the radial passages 71, 72 for purposes which will be apparent as the description proceeds.

A transversely extending boss 73 on the interior wall of outer sleeve member 42 is provided with a slot 74 that snugly receives one end of a resilient member 75 the opposite end of which is slotted as seen at 76 and fitted into a slot 77 provided in the reduced section shaft portion 56. The member 75, preferably, is fashioned as a flat leaf spring of suitable resilient material such as spring steel or the like and is disposed for torsional reaction when one end thereof is turned while the opposite end is constrained against turning upon the imposition of stresses below predetermined values.

Passages 77, 78 communicatively interconnect the annular grooves 69, 70 with respective port openings 79, 80 which, in turn, communicate with conduits 13 and 20.

For purposes of simplifying description the outer and inner elements 42 and 66 together with the resilient member 75, and pin 55 may be said to comprise a rotary emittance value designated in its entirety by the reference numeral 81.

*Operation*

With the system in a static or neutral condition flow therethrough from pump 12 will be interrupted by virtue of the relative rotative positions of the rotary emittance valve members 42 and 66, as seen in FIGURES 1, 2 and 6, and hence the shuttle valve 19 being of the spring centered type will be conditioned for its neutral position thus permitting free circulation of fluid between opposite ends of power cylinder 25. In this condition of the system the relative positions of the inner and outer elements 66 and 42 of emittance valve 81 will be such that the radial passages 71, 72 will not be in registering alignment with any of the axial passages 68 hence there will be no communicative connection between the port openings 79 and 80 because fluid flow from pump 12 will be blocked at the port 79.

Upon rotation of the operator's wheel 29, clockwise, for example, to effect a right turn, the shaft 31 acting through pin 55 will cause to rotate with it the inner valve sleeve 66 which upon rotation will bring the axial passages 68 into register with the radial passages 71, 72 and thereby permit the flow of fluid therethrough from pump 12 to the port 35 of shuttle valve 19, and thereafter by way of port 30 and conduit 18 to the reservoir 10. During the initial rotative movement of shaft 31 the pin 55 moves freely in the circumferentially extending slots 54 although resistance to movement of the shaft is offered by the torsional spring 75 the opposite end of which is mounted in the outer sleeve member 42. However, upon further turning of shaft 31 the pin 55, after having moved through an arc approximately 10°, eventually reaches the end of the slots 54 and establishes contact with the outer sleeve member 42 whereupon said outer sleeve is then picked up and rotated with said shaft. Rotation of outer sleeve valve member 42 will, by virute of its coupling with the rotor drive link shaft 38, effect orbital rotation of the inner pump element 33 to thereby produce a flow of fluid, in a manner well understood, in the interconnected conduits 21 and 22. The establishment of a pressure differential in conduits 21 and 22 operates in well-known manner to actuate the shuttle valve 19 and move it to the left, as viewed in FIGURE 1 hereof, thus conditioning said shuttle valve for directing fluid flow to the right end of cylinder 25 whereupon piston rod 28 is moved leftwardly to effect a turning of the steerable wheels through suitable mechanism (not shown). Release of turning force or pressure from the steering wheel 29 will permit torsion spring 75 to return shaft 31 and its coupled inner sleeve valve member 66 to a position wherein axial passages 68 are again out of register with the radial passages 71, 72 thereby blocking fluid flow from pump 12 through the emittance valve and preventing further turning of the steerable wheels of an associated vehicle.

Upon completion of the right turn the operator's wheel 29 is rotated counterclockwise carrying with inner sleeve valve member 66, outer sleeve valve member 42 and the intercoupled elements of the hand-pump assembly. This reversal of rotative movement will, of course, cause the inner element 33 of the hand-pump to orbit in an opposite direction and thus effect a reversal of direction of flow of fluid in conduits 21, 22 whereupon shuttle valve 19 will be moved rightwardly to permit discharge of fluid from the right end of cylinder 25 while simultaneously admitting fluid to the left end thereof to cause a withdrawal of piston rod 28 and a subsequent turning of the steerable wheels back toward a centered or straight-ahead position. When thus centered the passages in the inner and outer sleeve valve elements 66 and 42 will be out of register and flow of fluid through the system blocked.

It will be readily understood that in a left turn the sequence of operations, of course, will be the same as for a right turn except for a reversal of direction of rotation of the valving elements of the system.

From the above it will now be apparent that the proposed emittance valve arrangement when incorporated in a hydrostatic power steering system serves to provide a simplified means for converting such a system from an open-center to a closed-center type hydraulic circuit, as well as to a fashion improved hydrostatic power steering system. It also provides a hydrostatic power steering system wherein a linear spool shuttle valve therein is maintained substantially free from the accummulation of silting deposits which occasionally render the operation of such a valve unreliable. It further provides valving means cooperative with and readily incorporated in a conventional hand-pump assembly and operative responsive to the turning of an operator's steering control wheel for permitting or restricting the flow of fluid in a conventional hydrostatic power steering system.

Although only a preferred form of the invention has been illustrated, and that form described in detail, it will be apparent to those skilled in the art, that various modifications may be made therein without departing from the spirit of the invention or from the scope of the appended claims.

What is claimed is:

1. In a hydrostatic power steering system having a fluid power motor adapted for turning the steerable wheels of a vehicle, a source of fluid pressure, a shuttle valve actuable for controlling fluid flow to opposite ends of said motor for operation thereof, and a hand-pump assembly operative for hydraulically actuating said shuttle valve and for providing fluid pressure to said system upon interruption of flow from said source of fluid pressure, the combination therewith of valving means interposed in the system between said source and said shuttle valve and operative for selectively admitting and interrupting fluid flow from said source to said shuttle valve, said hand-pump and said valving means being operative responsive to the turning of an associated operator's control wheel.

2. The invention according to claim 1 but further characterized in that said valving means comprises an outer sleeve valve member and an inner sleeve valve member telescopingly disposed therein with said inner sleeve member being permitted limited rotative movement relative to said outer sleeve valve member, and in that said outer sleeve member is operatively coupled between said hand-pump assembly and drive shaft mechanism whereby said outer sleeve member is operative for transmitting rotative motion from the drive shaft mechanism to the hand-pump assembly.

3. The invention according to claim 1 and further characterized in that said valving means includes a housing having a bore therein and an outer sleeve valve member rotatably disposed in said bore and being universally coupled at one end thereof to said hand-pump assembly, an inner sleeve valve member rotatably disposed in the outer sleeve member, a drive shaft mechanism rotatably mounted in said housing and having means at one end thereof coupling said shaft mechanism to said inner and outer valve members with lost motion means interposed between the latter coupling means and said outer sleeve member to permit limited rotative movement of the inner member relative to the outer member, and resilient means carried at opposite ends thereof by said drive shaft mechanism and said outer sleeve valve member and yieldable to permit limited relative rotative movement therebetween.

4. The invention according to claim 3 but further characterized in that the housing in which said valving means is incorporated is fashioned integral with a housing structure of said hand-pump, and further in that the outer sleeve valve member is mechanically and operatively interconnected between said hand-pump and an operator's steering wheel whereby said valving means and said hand-pump are operative responsive to a turning of the associated operator's control wheel.

5. The invention according to claim 3 and further characterized in that said housing includes port openings communicatively connected one to said source of fluid pressure and another to said shuttle valve, and said inner sleeve valve member is fashioned with a plurality of axially extending and circumferentially spaced grooves, and said outer sleeve valve member is fashioned with a first and second axially spaced series of radially extending circumferentially spaced openings with one said series of openings in continuous communication with one of said port openings and the other of said series of openings in continuous communication with another of said port openings, and said outer and inner members being rotated relative to one another whereby certain of said grooves are disposed in registering alignment with said first and second series of radial openings to establish fluid communication between the said port openings.

6. The invention according to claim 5 but further characterized in that said inner and outer sleeve valve members are arranged so that the rotation of one of said sleeve valve members relative to the other of said members effectuates the establishment of fluid communication between said port openings prior to an actuation of said hand-pump.

7. The invention according to claim 3 but further characterized in that the means coupling said shaft mechanism to said inner and outer valve members includes a pin transversely mounted in the shaft thereof and having oppositely projecting ends extending through oppositely positioned close fit radial openings in said inner sleeve valve member and extending through circumferentially extending oppositely disposed radial slots in said outer sleeve valve member to permit limited relative rotative movement between said valve members.

8. The invention according to claim 7 but further characterized in that said resilient means comprises a flat spring steel element having one end thereof positioning in a slotted opening in said outer sleeve valve member and having a longitudinally extending slotted opening in an opposite end of said spring element with the latter end of said spring element extending into a slotted opening in the drive shaft mechanism and disposed so that the slotted opening of said spring element receives the pin of said coupling means.

9. In a hydrostatic power steering system having a fluid power motor adapted for turning the steerable wheels of a vehicle, a source of fluid pressure, shuttle valve means operative for controlling direction of fluid flow to and from opposite ends of said motor for operation thereof, and a hand-pump assembly normally operative for hydraulically actuating said shuttle valve and additionally operative for providing fluid pressure to said system upon interruption of flow from said source of fluid pressure, the combination therewith of rotary valve means communicatively interconnected in the system between said source and said shuttle valve and operative responsive to the turning of an associated operator's control wheel for selectively admitting and interrupting fluid flow from said source to said shuttle valve.

10. The invention according to claim 9 and further characterized in that said rotary valving means is coupled for operation with said hand pump and is arranged so that upon application of a force to the operator's hand wheel initial resistance to rotative movement of said valving means is provided by the hand-pump but upon continuation of said force said rotary valve means is operative to admit the flow of fluid in said system from said source prior to an actuation of the hand-pump, and subsequently said rotary valve means is operative upon removal of said force for interrupting the flow of fluid in said system from said source.

References Cited
UNITED STATES PATENTS

| | | | |
|---|---|---|---|
| 2,984,215 | 5/1961 | Charlson | 91—467 |
| 3,059,717 | 10/1962 | Moyer et al. | 180—79.2 |

EDGAR W. GEOGHEGAN, *Primary Examiner.*